(12) United States Patent
Davis

(10) Patent No.: US 8,575,074 B2
(45) Date of Patent: Nov. 5, 2013

(54) INSENSITIVE EXPLOSIVE COMPOSITION AND METHOD OF FRACTURING ROCK USING AN EXTRUDABLE FORM OF THE COMPOSITION

(75) Inventor: Lloyd L. Davis, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 184 days.

(21) Appl. No.: 13/153,972

(22) Filed: Jun. 6, 2011

(65) Prior Publication Data
US 2012/0305252 A1 Dec. 6, 2012

(51) Int. Cl.
*C09K 8/524* (2006.01)
*E21B 29/02* (2006.01)
*C06B 45/10* (2006.01)

(52) U.S. Cl.
USPC .............................. 507/239; 166/299; 149/19.6

(58) Field of Classification Search
USPC .......................... 149/19.6; 507/239; 166/299
See application file for complete search history.

(56) References Cited

U.S. PATENT DOCUMENTS

| | | | |
|---|---|---|---|
| 4,163,681 A * | 8/1979 | Rothenstein et al. | 149/11 |
| 4,545,622 A | 10/1985 | Yang | |
| 4,657,607 A | 4/1987 | Perotto et al. | |
| 5,244,475 A | 9/1993 | Lownds et al. | |
| 5,498,303 A * | 3/1996 | Hinshaw et al. | 149/19.6 |
| 5,798,480 A * | 8/1998 | Willer et al. | 149/19.4 |
| 5,949,016 A | 9/1999 | Barody et al. | |
| 6,358,339 B1 | 3/2002 | Hiskey et al. | |
| 6,458,227 B1 | 10/2002 | Hiskey et al. | |
| 6,562,159 B2 | 5/2003 | Ampleman et al. | |
| 6,881,283 B2 | 4/2005 | Lee et al. | |
| 2003/0133128 A1 * | 7/2003 | Groothuis et al. | 356/601 |
| 2003/0168140 A1 * | 9/2003 | Hiskey et al. | 149/19.9 |

OTHER PUBLICATIONS

"High-Nitrogen Explosives", Naud, etc., 29th International Pyrotechnics Seminar, Westminster, CO USA Jul. 14-19, 2002.*

* cited by examiner

*Primary Examiner* — Ling-siu Choi
*Assistant Examiner* — Aiqun Li
(74) *Attorney, Agent, or Firm* — Samuel L. Borkowsky

(57) ABSTRACT

Insensitive explosive compositions were prepared by reacting di-isocyanate and/or poly-isocyanate monomers with an explosive diamine monomer. Prior to a final cure, the compositions are extrudable. The di-isocyanate monomers tend to produce tough, rubbery materials while polyfunctional monomers (i.e. having more than two isocyanate groups) tend to form rigid products. The extrudable form of the composition may be used in a variety of applications including rock fracturing.

13 Claims, No Drawings

INSENSITIVE EXPLOSIVE COMPOSITION AND METHOD OF FRACTURING ROCK USING AN EXTRUDABLE FORM OF THE COMPOSITION

STATEMENT REGARDING FEDERAL RIGHTS

This invention was made with government support under Contract No. DE-AC52-06NA25396 awarded by the U.S. Department of Energy. The government has certain rights in the invention.

FIELD OF THE INVENTION

The present invention relates generally to an insensitive explosive composition that is a mixture of an explosive diamine monomer with a di- and/or poly-isocyanate monomer, to an insensitive explosive reaction product of a reaction between these monomers, and to a method of fracturing rock that employs an extrudable explosive composition.

BACKGROUND OF THE INVENTION

Insensitive explosive compositions are often physical mixtures of a high explosive compound embedded in a matrix of a polymeric binder (see, for example: Lund et al., U.S. Pat. No. 5,529,649 "Insensitive High Performance Explosive Compositions"; Doll et al., U.S. Pat. No. 6,648,998 "Reduced Sensitivity Melt-Cast Explosives"; Lee et al., U.S. Pat. No. 6,881,283, "Low Sensitivity Explosive Compositions"; Muller et al., U.S. Pat. No. 5,547,527, "Process for the Production of Desensitized Explosives"; all incorporated by reference herein). The mixture of explosive and binder is typically a physical mixture that relies on relatively weak forces for adhesion between the explosive and the binder.

SUMMARY OF THE INVENTION

The present invention provides an insensitive explosive composition. The composition may be an explosive oligomeric or polymeric reaction product of an explosive diamine monomer with a di-isocyanate monomer, a poly-isocyanate monomer, or mixtures thereof. The monomers having isocyanate groups may be alkyl di-isocyanate monomers, aryl di-isocyanate monomers, an alkyl poly-isocyanate monomers, aryl poly-isocyanate monomers. An embodiment explosive reaction product is an oligomer or polymer of 3,3'-diamino-4,4'-azoxyfurazan ("DAAF") monomer and a di-isocyanate monomer. Another embodiment explosive reaction product is a crosslinked polymer of DAAF monomer and a poly-isocyanate monomer.

An embodiment insensitive explosive composition is a reaction product of a reaction of a di-isocyanate monomer with an explosive diamine monomer. As the compositions cures but prior to a final cure, the composition may be extruded into a variety of shapes. After a final cure, the composition tends to be rubbery and tough.

Another embodiment is an explosive reaction product of a reaction of a poly-isocyanate monomer with an explosive diamine monomer. As the composition cures, but prior to a final cure, the composition may be extruded into a variety of shapes. After a final cure, the composition tends to be rigid.

Yet another embodiment insensitive explosive composition is a reaction product between a di-isocyanate monomer, an explosive diamine monomer, and glycidyl azide polymer. As the composition cures, but prior to a final cure, the composition may be extruded into a variety of shapes.

Still another embodiment insensitive explosive composition is a reaction product of between a poly-isocyanate monomer with an explosive diamine monomer and a glycidyl azide polymer. As the composition cures, but prior to a final cure, the composition may be extruded into a variety of shapes.

Another embodiment insensitive explosive composition is a reaction product between a di-isocyanate monomer, a poly-isocyanate monomer, an explosive diamine monomer, and glycidyl azide polymer. As the composition cures, but prior to a final cure, the composition may be extruded into a variety of shapes.

The present invention is also concerned with fracturing rock. An embodiment relates to extending a fracture network in rock by reacting an explosive diamine monomer with a monomer selected from an alkyl di-isocyanate monomer, an aryl di-isocyanate monomer, an alkyl poly-isocyanate monomer, an aryl poly-isocyanate monomer, a glycidyl azide polymer, or mixtures thereof, to form an extrudable explosive composition, and sending the composition into fissures in rock, and detonating the composition whilst it is in the rock fissures, thereby extending the fracture network in the rock.

DETAILED DESCRIPTION

This invention is concerned with relatively insensitive, explosive compositions. Embodiment compositions include insensitive explosive oligomeric or polymeric reaction products of reactions of explosive diamine monomers with di-isocyanate monomers and/or poly-isocyanate monomers. Other embodiments include relatively insensitive explosive polymeric reaction products of reactions of di-isocyanate monomers or poly-isocyanate monomers with explosive diamine monomers and glycidyl azide polymers, and un-polymerized mixtures of the explosive diamine monomers with glycidyl azide polymers.

A di-isocyanate monomer is defined as an organic compound including two isocyanate chemical groups. These are sometimes described as difunctional. Embodiments of these monomers include alkyl di-isocyanate monomers and aryl-di-isocyanate monomers.

A poly-isocyanate monomer is defined as an organic compound including three or more isocyanate chemical groups. These are sometimes referred to as polyfunctional, which means that the monomer has three of more functional groups (in this case, three of more isocyanate groups). Embodiments of these monomers include alkyl poly-isocyanate monomers and aryl poly-isocyanate monomers.

For the purposes of this invention, an insensitive explosive composition is defined as an explosive composition that meets all of the following three criteria:

1) the explosive composition exhibits no reaction at the maximum height of 320 centimeters in a standard Los Alamos National Laboratory ("LANL") drop-weight impact test, which involves dropping a 2.5 kilogram weight onto a 40 milligram sample using standard Type 12 tooling;

2) the explosive composition exhibits no reaction at the maximum load of 360 Newtons in the Bundesanstalt für Materialprüfung ("BAM") friction test, conducted in accordance with the UN Recommendations on the Transport of Dangerous Goods—Manual of Tests and Criteria, Section 13.5, Series 3 type (b) test prescriptions; and 3) the explosive composition exhibits no reaction in the Allegheny Ballistics Laboratory ("ABL") Electrostatic Discharge test at the maximum energy of 0.25 Joules.

In an embodiment, an insensitive explosive composition is a reaction product of an alkyl di-isocyanate monomer and an explosive diamine monomer. The reaction product is a polyurethane (see, for example: Odian, Principles of Polymerization, 3rd edition, John Wiley & Sons, Inc., New York, pp. 136-138, incorporated by reference herein), which is an alternating copolymer of the di-isocyanate monomer and the explosive diamine monomer. As they form, i.e. as they are curing, but prior to a final cure, they may be extruded into a desired shape. At this stage, i.e. prior to the final cure, it is believed that the compositions are oligomers and/or polymers. After the final cure, the reaction product tends to be a tough, rubbery polymeric product that is also an insensitive explosive composition. The extrudable form prior to the final cure is also an insensitive explosive composition.

In another embodiment, an insensitive explosive composition is a reaction product of a catalyzed reaction of an alkyl poly-isocyanate monomer and an explosive diamine monomer. The reaction products are polyurethanes. When poly-isocyanates are used, the polyurethanes tend to be cross-linked. As they form, i.e. as they are curing, but prior to a final cure, they may be extruded into a desired shape. At this stage, i.e. prior to the final cure, it is believed that this form of the composition (i.e. an extrudable form) includes oligomers of the explosive diamine monomer and the poly-isocyanate monomer. After the final cure, the reaction product tends to be a rigid polymer product. The rigidness is likely a result of crosslinking Both the extrudable form and the rigid polymer product are insensitive explosive compositions.

In a preferred embodiment, the explosive diamine monomer is 3,3'-diamino-4,4'-azoxyfurazan ("DAAF") (see, for example, Hiskey et al., U.S. Pat. No. 6,358,339, "Use of 3,3'-diamino-4,4'-azoxyfurazan and 3,3'-diamino-4,4'-azofurazan as insensitive high explosive materials,"; Hiskey et al., U.S. Pat. No. 6,552,201, "Preparation of 3,3'-diamino-4, 4'-azofurazan," both incorporated by reference herein). An embodiment explosive composition is, for example, an oligomer or alternating copolymer of DAAF monomer and a di-isocyanate monomer such as, but not limited to, 3-isocyanatomethyl-3,5,5-trimethylcyclohexyl-isocyanate which is also known more commonly as isophorone isocyanate ("IPDI"). Another embodiment is an alternating copolymer of DAAF with an aryl di-isocyanate monomer such as, but not limited to, 2,4-diisocyanato-1-methyl toluene, also known as toluene di-isocyanate.

An embodiment oligomeric or polymeric reaction product of toluene-di-isocyanate monomer with DAAF is an insensitive explosive composition. Prior to a final cure, the material may be extruded. The extrudable form is an insensitive explosive composition. The final cured reaction product is also an insensitive explosive composition with good thermal stability and compatibility as determined under U.S. Military Standard 1751A.

Another embodiment insensitive explosive composition is the mixture of glycidyl azide polymer and DAAF, which react with di- and/or poly-isocyanate monomers to produce an insensitive explosive polymeric reaction products. In an embodiment wherein the di-isocyanate monomer was IPDI, the final cured insensitive explosive reaction product was found to be a tough, flexible rubber.

Another embodiment insensitive explosive composition is the mixture of R45M (a commercially available hydroxyl-terminated polybutadiene ("HTPB")) and DAAF, which produces a reaction product with a di-isocyanate monomer or poly-isocyanate monomer. The reaction is believed to involve reaction of an isocyanate group from a monomer with an amine from the DAAF, and reaction of the other isocyanate group from the monomer with GAP. An example is the reaction product of R45M HTPB and DAAF with 1-isocyanato-4-[(4-isocyanatophenyl)methyl]benzene ("MDI").

A benefit of the insensitive nature of these explosive compositions is that they can be more safely subjected to the types of processing conditions typically required for extrudable explosives. Another benefit relates to an expanded role of extrudable explosives in applications in which the sensitivity of current explosive formulations restricts or prohibits the use of extrudable explosives. Another benefit relates to the mechanical properties of the explosive composition of this invention, which allows a range of applications in which enhanced mechanical properties of these compositions may be exploited for use as structural members or to improve mechanical properties of a system, device, or product.

The compositions of this invention are useful for a variety of applications. Military and police entry teams currently use extrudable explosives in forced entry situations wherein the extrudable material is forced into door crevices and other openings using a common caulking gun. The insensitive explosive compositions of this invention could be used for these purposes with improved safety.

Extrudable explosives are also used for Explosive Ordnance Disposal ("EOD"). The insensitive explosive compositions of this invention could be used for EOD with improved safety.

The insensitive explosive compositions of this invention could be used in mining applications. The booster charge used in commercial blasting operations should be physically durable enough to withstand falls of 60 meters or more into bore holes that are subsequently loaded with bulk explosives. Booster explosives fabricated from embodiment insensitive explosive compositions of this invention display greatly improved mechanical toughness, together with insensitivity to impact and other stimuli. Therefore, the insensitive extrudable explosive compositions of this invention may be used as booster charges for commercial blasting operations.

Seismic prospecting with explosives involves detonation of a small charge that may be placed underwater, in a shallow wellbore, or may be extruded (e.g. by injection) into small openings. An array of detectors is utilized to collect information from the seismic wave propagating out from this point source. Selection of explosives suited for this technique has long been a subject of interest (see, for example: Johnson et al., Geophysics, 1935, vol. 1(2), pp. 228-238, incorporated by reference). These applications may benefit from an explosive with small critical diameter, which embodiment insensitive explosive compositions of this invention have. The extrudable, relatively insensitive explosive compositions of this invention may be used for these exploratory mapping applications.

Insensitive explosive compositions of this invention may also be used in well completion. The extrudable insensitive explosive compositions of this invention may also be used in oil well completion devices in which the explosive may be injected into a charge assembly remotely. Well completion techniques using explosive compositions have been the subject of extensive research; the first recorded shot was conducted in 1865. Ford et al. in U.S. Pat. No. 4,391,337, incorporated herein by reference, reported using a high-velocity jet to initiate fractures in the production zone of a well. A propellant gas was used to extend the fractures.

In hydraulic fracturing of oil and gas wells, a fluid under high pressure is injected to create fractures in rock, which are then "propped" open by a proppant such as sand or other particulate materials. One commonly used proppant is U.S. Standard Sieve size #20 sand, which has a typical particle diameter in a range of 0.710-0.850 millimeters. A complication in hydraulic fracturing is that not all fractures are adequately loaded with proppant. Inadequately propped fractures may close when the hydraulic pressure is released. Therefore, these fractures are not productive.

The insensitive explosive compositions of this invention may be used as a hydraulic working fluid that is extruded (e.g. by injection under high pressure) into rock fractures, potentially traveling a considerable distance from the wellbore. Once extruded into the fractures, the composition may be subsequently cured in situ under hydraulic pressure to form a self-propping matrix. Alternatively, the composition may be left uncured and used in combination with a conventional proppant. Subsequent detonation of the explosive-filled fracture pattern will produce an extended volume of productive material between these cracks, and extending outwards into adjacent rock.

Previous explosive well completion methods have traditionally focused on charges which are detonated within the wellbore, sometimes resulting in compaction of the surrounding geologic material and reduction of well yield. Methods of timing successive small explosive charges within the wellbore to generate wave interactions in adjacent rock have been developed, as described in the "technology update" article entitled "Well Stimulation/Completion Using High Explosives, Journal of Petroleum Technology 58(2), 1996 pp. 22-24, incorporated by reference herein. In this application, an embodiment extrudable insensitive explosive composition would be extruded into rock fractures outside the well case by methods intended to exclude the explosive composition from of the main body of the wellbore. Controlled timing of detonations in adjacent fracture patterns may be exploited in order to generate stress wave interactions in the volume of material between and extending outward from the explosively-filled fractures, which are favorable to producing an extended volume of dilatancy in the surrounding rock.

DAAF has a critical diameter between 1 and 1.5 millimeter, which means that it will propagate a steady detonation unconfined in a right circular cylinder of this dimension, so the critical thickness of an unconfined planar form is expected to be on the order of 0.63 millimeters. When confined in rock this dimension will be reduced, allowing detonation to propagate in small sizes. A critical dimension of this size combined with insensitivity to mechanical stimuli is uncommon. The extrudable, insensitive explosive compositions of this invention are polymerizable viscous fluids. It is believed that these extrudable, polymerizable, insensitive explosive compositions are the first that also possess a small critical diameter.

The Examples below illustrate some non-limiting embodiments. Although Example 1 does not include a di-isocyanate or poly-isocyanate monomer, it does demonstrate a reaction of DAAF with an isocyanate compound. Dibutyltin dilaurate ("DBTDL") was the catalyst generally employed, although other catalysts suitable for the reaction may be used instead. The polymerization may also proceed uncatalyzed at higher temperatures. Unless otherwise indicated, all reactions were conducted without solvent, which is typical for solid propellant cast-cure systems.

Example 1

A solution of 212 milligrams of 4,4'-diamino-3,3'-azoxyfurazan ("DAAF") in dry tetrahydrofuran in a jacketed round-bottomed flask was prepared. 238 milligrams of phenyl isocyanate were added to the solution, followed by 1 milligram of dibutyltin dilaurate ("DBTDL"). The reaction vessel was fitted with a thermometer, reflux condenser and magnetic stirrer. This reaction mixture was refluxed, then cooled to ambient temperature and the reaction product isolated. Analysis of the reaction product by Fourier transform infrared spectroscopy ("FTIR"), nuclear magnetic resonance spectroscopy ("NMR") and liquid chromatography—mass spectroscopy ("LC-MS") confirmed reaction of the phenyl isocyanate with DAAF. Both the mono- and diphenylurethane derivatives of DAAF were observed, together with a small amount of unreacted DAAF, trace amounts of unreacted phenyl isocyanate, and aniline.

Example 2

3-isocyanatomethyl-3,5,5-trimethylcyclohexyl-isocyanate (250 milligrams, "IPDI") were combined with DAAF (250 milligrams) and a trace of DBTDL having a concentration of 1 mg/ml in dichloromethane. The product was a rubbery solid. The product showed no reaction to impact, friction, and spark tests, and had a mild burn character to open flame. The reaction product was an insensitive explosive composition.

Example 3

DAAF (400 milligrams) was combined with 3-isocyanatomethyl-3,5,5-trimethylcyclohexyl-isocyanate (5 milligrams) and 95 milligrams of a solution of a hydroxyl-terminated glycidyl azide polymer known as "GAP 5227" in ethyl acetate (3M L15129, 40% in ethyl acetate, GAP—ethyl acetate weight 237.5 mg) with trace of dibutyltin dilaurate (target concentration is typically 0.001 to 0.005 percent by weight of the catalyst, from solution of 1 mg/ml DBTDL in methylene chloride). The reaction proceeded in approximately 1 hour at ambient temperature. Solvent was removed by evaporation in fume hood at approximately 50° C. overnight. The reaction product was a tough rubber material that was also an insensitive explosive composition.

Example 4

DAAF (2.0 grams) was combined with GAP (1.88 g, 40% in ethyl acetate) and IPDI (25 mg) with approximately 1 milligram of DBTDL. The system cured in approximately 1 hour at ambient temperature. The ethyl acetate was removed by evaporation overnight in fume hood at ca. 50° C. The reaction product was an insensitive explosive composition.

Example 5

A 5 gram batch composed of 4 grams DAAF, 950 milligrams of GAP (40% in ethyl acetate) and 50 milligrams of IPDI and a trace of DBTDL was reacted to form a solid reaction product that was an insensitive explosive composition.

Example 6

DAAF was reacted with DESMODUR N-100 (BAYER MATERIAL SCIENCE), which is a solvent-free aliphatic polyfunctional isocyanate based on hexamethylene di-isocyanate. DESMODUR N-100 has functionality of approximately 4 isocyanate groups and molecular weight of approximately 478 g/mol. The total sample mass was 500 milligrams, composed of 212 milligrams DAAF and 288 milligrams of DESMODUR N-100. Reaction proceeded after a trace amount of DBTDL (1 mg/ml in $CH_2Cl_2$) catalyst was added with stirring. After 1 hour at ambient temperature, the product was a rigid, hard solid. The rigidness likely resulted from cross-links. The reaction product was an insensitive explosive composition.

Example 7

DAAF (ATK THIOKOL) was dried in a vacuum oven at 50° C. A sample was prepared that consisted of 1.25 g of this DAAF, 1.125 grams of GAP which had been previously stripped of ethyl acetate by vacuum distillation in a rotary evaporator, and 0.125 grams of IPDI with a trace of dibutyltin dilaurate. The sample was mixed by hand and loaded into a disposable 10 cc plastic syringe, which had been attached to a brass tube with inside diameter of 3 mm and length of 100 mm. The sample was extruded by hand from the syringe into the tube, and it cured inside the tube. Both the extrudable composition and the final cured reaction product were insensitive explosive compositions.

Example 8

A DAAF/GAP/IPDI system composed of 70% DAAF was scaled up to a batch size of 25 grams. The batch was composed of 17.5 grams of DAAF which had been dried in a vacuum oven at 50° C., 7.116 grams of GAP previously stripped of ethyl acetate by vacuum distillation in a rotary evaporator and 0.384 grams of IPDI with 50 mg of DBTDL. A portion of this sample was extruded into a brass tube with inside diameter of 3 mm and length of 100 mm. The sample was extruded by hand into the tube, and it cured inside the tube. Cure proceeded at ambient temperature over a few hours and resulted in a hard, slightly rubbery solid. Both the extrudable form of the composition and the final cured, hard, slightly rubbery solid were insensitive explosive compositions. The tube was then attached to an aluminum witness plate along with a Reynolds RP-3 detonator. About 20 mg of SEMTEX 1H was used to couple the output of the detonator into the test sample. The sample was detonated on a witness plate.

Example 9

4 grams of DAAF that was dried in a vacuum oven at 50° C. was combined with 4 grams GAP 5227 (also stripped of ethyl acetate and dried) and 2 grams of tungsten carbide ($W_2C$), 0.2 grams of toluene di-isocyanate and a trace of DBTDL. This mixture was degassed on a shaker table under a hard vacuum as typically practiced in solid propellant formulation work, and loaded by hand into a brass tube having an internal diameter of 5.56 mm and length of 150 mm. The resulting product exhibited a bulk density of 1.95-2.00 g/cc. Both the extrudable material and the final cured solid were insensitive explosive compositions. The sample was detonated with a Reynolds RP-3 detonator.

Example 10

A 500 milligram batch of DAAF and DESMODUR N-3200 (an aliphatic polyfunctional isocyanate) in a 50:50 molar ratio was prepared with a trace of DBTDL. Product was a rigid, brittle solid. The cross-links provided by the polyfunctional isocyanate resulted in more rigid material. The rigid reaction product was an insensitive explosive composition.

Example 11

A 500 milligram batch sample of 50:50 by weight DAAF with MDI (4,4'-methylene-bis-diphenyldi-isocyanate) was prepared with a trace of DBTDL. The product was a rigid, brittle solid that was also an insensitive explosive composition.

Example 12

A 500 milligram batch sample consisted of 250 milligrams DAAF, 225 milligrams R45M HTPB (a hydroxyl-terminated polybutadiene) and 25 milligrams of Desmodur N3200 with a trace of DBTDL. The reaction initiated within a few minutes to yield a tough flexible rubber that was in insensitive explosive composition.

Example 13

A 500 milligram batch sample that consisted of 250 milligrams DAAF, 225 milligrams R45M HTPB (hydroxyl-terminated polybutadiene) and 25 milligrams of MDI (4,4'-methylene-bis-diphenyl-di-isocyanate) was prepared with a trace of DBTDL. The reaction initiated within a few minutes to yield a tough flexible rubber that was an insensitive explosive composition.

Example 14

A 500 milligram sample that consisted of 250 milligrams DAAF, 200 milligrams MDI (4,4'-methylene-bis-diphenyl-di-isocyanate) and 50 milligrams glycerin was prepared with a trace of DBTDL. The reaction was complete within a few minutes. The reaction evolved heat. The product was a rigid brittle solid. The increased crosslink density from the polyol resulted in rigid solid that was an insensitive explosive composition.

Example 15

A sample was prepared by combining 250 milligrams DAAF with 25 milligrams carbon (lampblack) and mixed under petroleum ether using an ultrasonic probe for 30 seconds. The petroleum ether was allowed to evaporate and the resulting mixture was combined with 200 milligrams GAP 5227 (dried), 25 milligrams MDI and a trace of DBTDL. The reaction was allowed to proceed to form a reaction product that was a tough, flexible rubber that was black in color and also an insensitive explosive composition.

Example 16

DAAF (ATK Thiokol) was recrystallized from DMSO and dried in a vacuum oven. 150 grams of this DAAF was mixed with 135 grams of solvent-free GAP and 15 grams of 1-isocyanato-4-[(4-isocyanatophenyl)methyl]benzene ("MDI") with 30 milligrams of DBTDL. A portion of this mixture was loaded into a 30 cc disposable plastic syringe attached via a length of ⅛-inch outside diameter Swagelok tubing to a sealed enclosure with an inside diameter of 1.5 inches and depth of 1 inch. This enclosure was evacuated with a vacuum pump, and afterwards a valve was used to isolate the pump from the tubing. The explosive was extruded by hand into the sealed and evacuated enclosure. A detonator (Reynolds RP-1) was attached to the transparent polycarbonate top of the enclosure, with a 0.010-inch thick stainless steel layer between the detonator output pellet and the explosive. The explosive was detonated; the heavy steel base of the enclosure formed a witness plate.

Example 17

A mixture of 50% by weight DAAF with 50% by weight GAP was loaded into a transparent poly(vinyl chloride) tube having an inside diameter of 1-inch and length of 12 inches. Final density was 1.50 g/cc. This tube was fitted with Dynasen PZT (lead titanate-zirconate) pins at well-defined intervals to provide a measurement of detonation velocity. The tube was fitted with a Reynolds RP-1 detonator and booster pellet of PBX9407 which was ½ inch in diameter and ½ inch long. Analysis of the data showed a steady detonation with velocity of 6.80±0.01 kilometers per second.

Although the present invention has been described with reference to specific details, it is not intended that such details should be regarded as limitations upon the scope of the invention, except as and to the extent that they are included in the accompanying claims.

What is claimed is:

1. An insensitive explosive composition comprising an explosive oligomeric or polymeric reaction product of an explosive diamine monomer with a di-isocyanate monomer, a poly-isocyanate monomer, or mixtures thereof.

2. The insensitive explosive composition of claim 1, wherein said di-isocyanate monomer is selected from an alkyl di-isocyanate monomer or an aryl di-isocyanate monomer, and wherein said poly-isocyanate monomer is selected from an alkyl poly-isocyanate monomer or an aryl poly-isocyanate monomer.

3. The insensitive explosive composition of claim 1, wherein said insensitive explosive composition is extrudable.

4. The insensitive explosive composition of claim 1, wherein said insensitive explosive composition is a cured, rubbery, tough, polymer.

5. The insensitive explosive composition of claim 1, wherein said insensitive explosive composition is a rigid polymer.

6. The insensitive explosive composition of claim 2, wherein said alkyl di-isocyanate monomer is 3-isocyanatomethyl-3,5,5-trimethylcyclohexyl di-isocyanate.

7. The insensitive explosive composition of claim 2, wherein said aryl di-isocyanate monomer is selected from 4-di-isocyanato-1-methyl-benzene, 1-isocyanato-4-[(4-isocyanatophenyl)methyl]benzene, 1-isocyanato-2-[(2-isocyanatophenyl)methyl]benzene, 1-isocyanato-2-[(4-isocyanatophenyl)methyl]benzene, or di-isocyanato-containing isomers thereof.

8. The insensitive explosive composition of claim 1, wherein said explosive diamine monomer is 4,4'-diamino-3,3'-azoxyfurazan.

9. The insensitive explosive composition of claim 8, wherein said insensitive explosive composition is extrudable.

10. The insensitive explosive composition of claim 8, wherein the di-isocyanate monomer is 3-isocyanatomethyl-3,5,5-trimethylcyclohexyl-di-isocyanate.

11. The insensitive explosive composition of claim 1, wherein said explosive reaction product is a product of a condensation reaction of 4,4'diamino-3,3'-azoxyfurazan with a di-isocyanate monomer selected from 3-isocyanatomethyl-3,5,5-trimethylcyclohexyl-di-isocyanate, 2,4-diisocyanato-1-methyl benzene, 1-isocyanato-4-[(4-isocyanatophenyl)methyl]benzene, 1-isocyanato-2-[(2-isocyanatophenyl)methyl]benzene, or 1-isocyanato-2-[(4-isocyanatophenyl)methyl]benzene.

12. The insensitive explosive composition of claim 1, wherein the explosive reaction product is a product of a condensation of an explosive diamine monomer, a glycidyl azide polymer, and an isocyanate-containing monomer selected from a di-isocyanate monomer, a poly-isocyanate monomer, or mixtures thereof.

13. A polymer comprising 4,4-diamino-3,3'-azoxyfurazan monomer and a monomer selected from a di-isocyanate monomer, a poly-isocyanate monomer, or mixtures thereof.

* * * * *